US011225118B2

(12) United States Patent
Jämsä et al.

(10) Patent No.: US 11,225,118 B2
(45) Date of Patent: Jan. 18, 2022

(54) BOGIE FOR A FORESTRY VEHICLE AND VEHICLE WITH AT LEAST ONE BOGIE AXLE

(71) Applicant: NAF NEUNKIRCHENER ACHSENFABRIK AG, Neunkirchen (DE)

(72) Inventors: Jouni Kalervo Jämsä, Tampere (FI); Bernhard Schnabel, Starnberg (DE); Markus Stöckl, Munich (DE); Jürgen Stadler, Munich (DE)

(73) Assignee: NAF NEUNKIRCHENER ACHSENFABRIK AG, Neunkirchen (DE)

( * ) Notice: Subject to any disclaimer, the term of this patent is extended or adjusted under 35 U.S.C. 154(b) by 0 days.

(21) Appl. No.: 16/387,405

(22) Filed: Apr. 17, 2019

(65) Prior Publication Data
US 2019/0322148 A1 Oct. 24, 2019

(30) Foreign Application Priority Data

Apr. 19, 2018 (EP) .................................... 18168275

(51) Int. Cl.
*B60G 5/01* (2006.01)
*B60G 5/04* (2006.01)
*B60G 5/02* (2006.01)

(52) U.S. Cl.
CPC .................. *B60G 5/01* (2013.01); *B60G 5/02* (2013.01); *B60G 5/04* (2013.01); *B60G 2200/318* (2013.01)

(58) Field of Classification Search
CPC ... B60G 5/00; B60G 5/01; B60G 5/02; B60G 5/04; B60G 2200/318; B60G 2204/47;
(Continued)

(56) References Cited

U.S. PATENT DOCUMENTS 3,527,471 A * 9/1970 Clark .................... B62D 61/10
280/81.5
8,333,401 B2 12/2012 Lares
(Continued)

FOREIGN PATENT DOCUMENTS

CN 105438297 A 3/2016
DE 199 19 959 A1 11/2000
(Continued)

OTHER PUBLICATIONS

Decision to Grant dated Nov. 28, 2019 in corresponding Russian Patent Application No. 2019111480/(022312).
(Continued)

*Primary Examiner* — Karen Beck
(74) *Attorney, Agent, or Firm* — Medler Ferro Woodhouse & Mills PLLC

(57) ABSTRACT

A bogie for a forestry vehicle is disclosed that includes a bogie body, which has a first wheel hub for arrangement of a first wheel and a second wheel hub for arrangement of a second wheel. The bogie includes a swing arm pivotably hinged at a first end portion on the bogie body, and at a second end portion has a wheel hub for arrangement of a center wheel between the first wheel and the second wheel. The bogie further includes a spring and/or damper element, which at one end portion is hinged on the bogie body and at the other end portion is hinged on the second end portion of the swing arm and by means of which the swing arm is capable of being applied with force. A vehicle, in particular a forestry vehicle, is also disclosed having at least one bogie axle with such a bogie.

17 Claims, 3 Drawing Sheets

Figure 1:
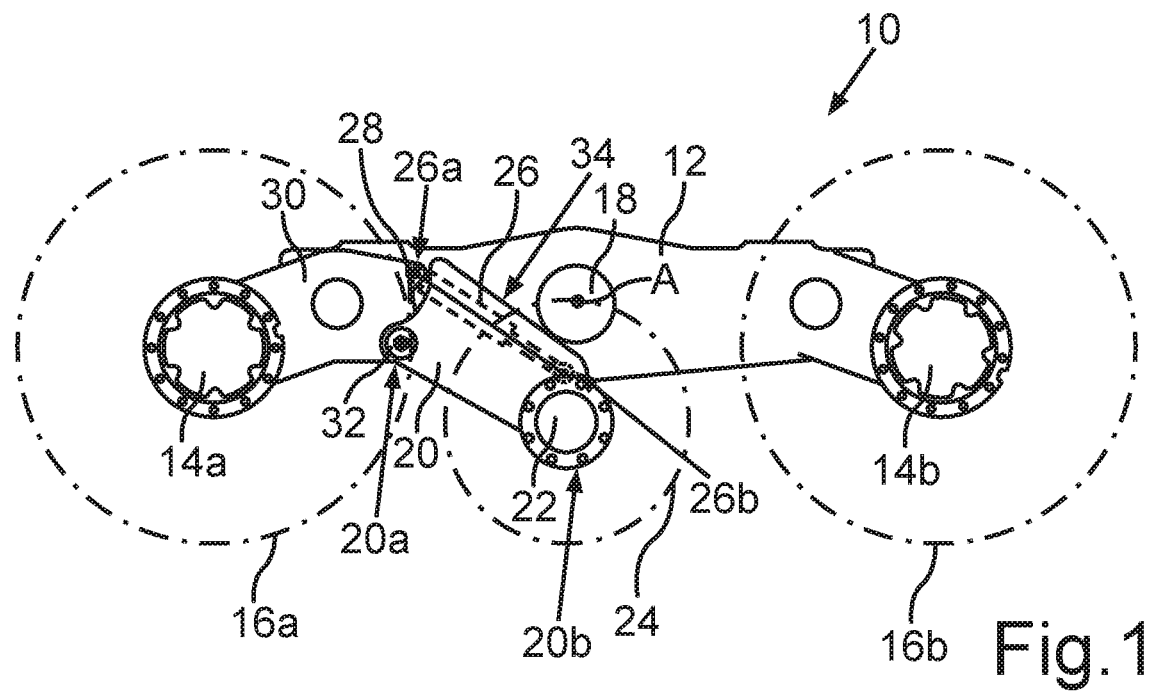

(58) Field of Classification Search
CPC .... B62D 61/12; B62D 61/125; B62D 55/104; B62D 55/112; B62D 55/116; B62D 11/20; B61F 5/30
USPC ........ 180/24.01, 24.02, 24.13; 280/676, 678, 280/6.156
See application file for complete search history.

(56) References Cited

U.S. PATENT DOCUMENTS

| | | | |
|---|---|---|---|
| 8,540,040 B2 * | 9/2013 | Simula | B62D 55/075 |
| | | | 180/9.46 |
| 9,415,817 B2 * | 8/2016 | Rackow | B62D 55/12 |
| 9,434,427 B1 * | 9/2016 | Tiede | B62D 55/10 |
| 10,308,296 B2 * | 6/2019 | Piens | B62D 55/088 |
| 2006/0254832 A1 * | 11/2006 | Strong | B62D 55/14 |
| | | | 180/9.5 |
| 2008/0084111 A1 | 4/2008 | Rainer | |
| 2013/0154345 A1 | 6/2013 | Schulz et al. | |
| 2014/0138168 A1 | 5/2014 | Steltz et al. | |
| 2015/0083504 A1 | 3/2015 | Pohjoisaho et al. | |

FOREIGN PATENT DOCUMENTS

| | | | | |
|---|---|---|---|---|
| DE | 10258877 A1 | | 6/2004 | |
| EP | 0052417 A1 | | 5/1982 | |
| FR | 794572 A | * | 2/1936 | ............... B60G 5/02 |
| GB | 875691 A | | 8/1961 | |
| RU | 2015 109 300 A | | 10/2016 | |
| WO | 93/19975 A1 | | 10/1993 | |

OTHER PUBLICATIONS

Communication pursuant to Article 94(3) EPC in corresponding EP Appl. No. 18168275.8, dated Feb. 1, 2021.

* cited by examiner

BOGIE FOR A FORESTRY VEHICLE AND VEHICLE WITH AT LEAST ONE BOGIE AXLE

The invention relates to a bogie for a forestry vehicle, comprising a bogie body, which has a first wheel hub for arrangement of a first wheel and a second wheel hub for arrangement of a second wheel. The invention further relates to a vehicle, in particular forestry vehicle, with at least one bogie axle comprising such a bogie.

Bogie axles, also known as tandem axles, are axles that are connected to a vehicle frame in a rotatable manner and can be provided with two wheels in a row. Usually one bogie is arranged on each side of a frame-fixed bogie axle beam so that the bogie can be pivoted around a horizontal axis which is transverse to the vehicle's longitudinal axis. The static axle load of the two wheels then remains essentially constant in all positions of the bogie. The advantage of this construction is that the wheels remain in contact with the ground even when there is considerable unevenness. This is used, for example, in forestry vehicles that have to drive over tree stumps or earth mounds. For a good load-bearing capacity and traction, typically both wheels of each bogie are powered to drive the vehicle. Therefore, bogie axles generally provide excellent off-road capabilities and traction in heavy terrain. However, in very wet conditions and on soft soil the load-carrying capacity of the ground is often not sufficient to carry the wheel load of the vehicle so that the wheels sink too far into the ground, leaving deep ruts and damaging the soil. In some cases, the vehicle may even get stuck in the mud, not being able to maneuver at all any more.

From the truck and trailer market, solutions are known where a third or even a fourth row of wheels reduces the ground pressure to prevent damaging the ground. However, these solutions lack the climbing capabilities of a bogie axle: when driving over a large obstacle such as a stump or a rock, the first and last wheel of such a "tridem" arrangement may lose ground contact whereas the center wheel carries the entire load, leading to a less smooth and much rougher ride.

It is the task of the present invention to provide a bogie that allows for an improved load-bearing and reduced soil loading especially on soft ground such as e.g. peat soil while maintaining the climbing capabilities of a standard bogie when driving on harder ground and over obstacles A further task of the present invention consists in providing a vehicle with at least one bogie axle comprising such a bogie.

These tasks are solved by a bogie and a vehicle according to the independent claims. Advantageous configurations of the invention are specified in the respective dependent claims, wherein advantageous configurations of the bogie are to be regarded as advantageous configurations of the vehicle and vice versa.

A first aspect of the invention relates to a bogie for a forestry vehicle, comprising a bogie body, which comprises a first wheel hub for arrangement of a first wheel and a second wheel hub for arrangement of a second wheel. According to the invention, the bogie comprises a swing arm, which is pivotably hinged at a first end portion on the bogie body and at a second end portion comprises a wheel hub for arrangement of a center wheel between the first wheel and the second wheel, and a spring and/or damper element, which at one end portion is hinged on the bogie body and at the other end portion is hinged on the swing arm and by means of which the swing arm is capable of being applied with force. In other words, according to the invention, a bogie is provided which comprises a third wheel hub for a center wheel, wherein the third wheel hub is arranged at a second end portion of a swing arm between the first and second wheel hubs and wherein said swing arm is mounted on the bogie body such that the third wheel hub can be swivelled relative to the bogie body and thus relative to the first and second wheel hubs. Further, the swivelling of the swing arm can be controlled via the spring and/or damper element, which at one end is also mounted on the bogie body and at the other end to the swing arm to apply a downforce to the third wheel hub and thus to a center wheel that is mounted thereon. This allows for an improved load-bearing and reduced soil load capacity especially on soft ground since the wheel contact area on the ground can be advantageously increased. However, since the wheel hub of the swing arm can be swivelled relative to the bogie body and the first and second wheel hubs, it can be reliably prevented that a vehicle, which is equipped with the bogie according to the invention, while driving over obstacles such as ground bumps, trees, rocks and the like, is supported only on the center wheel while the first and/or second wheel have no ground contact. Instead, the swing arm and thus the wheel hub can be swivelled as soon as an opposing force (upforce) on its wheel hub surpasses the force (downforce) applied by the spring and/or damper element such that the wheel hub and thus a center wheel mounted thereon can evade the obstacle while the first and/or second wheel keeps or at least regains ground contact. Generally, the swing arm can be designed such that its wheel hub is positioned approximately centered with a deviation of ±20% between the first and second wheel hubs of the bogie body in order to provide a uniform pressure relief. Alternatively, the swing arm can be designed such that its wheel hub is or can be positioned closer to the first wheel hub or closer to the second wheel hub. Preferably it is provided that the first and/or second wheel hub is or are driveable while the wheel hub of the swing arm is not driveable.

In an advantageous configuration of the invention, the first end portion of the swing arm is mounted on the bogie body by means of a rotary joint, which preferably comprises at least two slide bearing bushing. The use of a rotary joint allows for a precise guidance of the rotary or swivelling motion of the swing arm. While generally only one slide bearing bushing may be used, the optional use of at least two or more slide bearing bushings reduces the contact pressure on each bushing and allows for smaller bushings and/or maintenance-free bushing materials.

In a further advantageous configuration of the invention it is provided that the swing arm and the spring and/or damper element relative to a linkage of the bogie body for hinging the bogie on an axle beam of a bogie axle are mounted on the same side or on opposite sides on the bogie body. In other words it is provided that the swing arm and the spring and/or damper element are hinged on the same side of the bogie body or on different sides of the bogie body with respect to the linkage, around which the bogie can be pivoted horizontally with respect to a vehicle's longitudinal axis. This allows for a variable arrangement depending on the available assembly space and the desired spring arms and thus of the desired spring deflection behavior of the swing arm and the spring and/or damper element. Alternatively or additionally it is provided that the swing arm and the spring and/or damper element are hinged on the same component of the bogie body or on different components of the bogie body. The swing arm and the spring and/or damper element may for example be connected to a flange of a single component of the bogie body to simplify assembly and disassembly of the swing arm and the spring and/or damper element and/or to adjust the lever arms of the swing arm and the spring and/or damper element. Alternatively, the swing arm and the spring and/or damper element may be connected to different components of the bogie body, for example to adjust a lever arm between a swing arm pivoting point and the spring and/or damper element and/or to achieve a different pivoting behavior of the swing arm.

This allows a high degree of design freedom and adaptability to different intended purposes of the bogie.

In a further advantageous configuration of the invention it is provided that the spring and/or damper element at least in portions is arranged within an associated casing of the swing arm. In other words it is provided that the spring and/or damper element is at least partially shielded by the swing arm in order to prevent damages of the spring and/or damper element. It may be provided that the spring and/or damper element is fully shielded by the casing of the swing arm regardless of the pivoting position of the swing arm. Alternatively it may be provided that a part of the spring and/or damper element is not arranged within the associated casing of the swing arm and/or that the degree of shielding of the spring and/or damper element depends on the pivoting position of the swing arm. The spring and/or damper element may for example dip into the casing of the swing arm if the swing arm is rotated. The casing may for example be provided in that the swing arm at least in portions is hollow inside and/or U-shaped to protect the spring and/or damper element at least from three sides. It may be provided that the swing arm is circumferentially closed to form the protective casing such that the spring and/or damper element is protected from four sides or more.

In a further advantageous configuration of the invention a stop is provided, by means of which a movability of the swing arm relative to the bogie body is limited. This provides an easy way of limiting the range of the pivoting movability of the swing arm relative to the bogie body in order to avoid damaging of the swing arm, the spring and/or damper element, a center wheel that is mounted on the swing arm and/or the bogie body. The stop may generally be a separate mechanical element (limit stop) and/or may be provided as a functional element of the spring and/or damper element, e.g. as an internal stop of a cylinder or a hydraulic valve limiting the flow of the hydraulic fluid.

In a further advantageous configuration of the invention it is provided that at least one rotation axis of the swing arm and at least one rotation axis of the spring and/or damper element are arranged axially parallel relative to each other. This avoids tensions during the pivoting motion of the swing arm. Alternatively and/or additionally it is provided that at least one rotation axis of the swing arm is arranged coaxially relative to a rotation axis of the first or second wheel hub. In other words it is provided that the swing arm pivots around the same rotation axis as the first or the second wheel hub. This provides a longer swing arm and a larger vertical movability of the center wheel.

In a further advantageous configuration of the invention it is provided that the spring and/or damper element comprises a hydraulic cylinder. A hydraulic cylinder can advantageously be used to apply a desired force to the swing arm in order to generate a desired wheel contact force and/or swing arm movement. Further, a hydraulic cylinder can be used to apply an essentially constant force independently of the relative pivoting position of the swing arm with respect to the bogie body and/or to apply a varying force depending on the relative pivoting position of the swing arm with respect to the bogie body. The hydraulic cylinder can generally be a single-acting hydraulic cylinder or preferably a double-acting hydraulic cylinder.

In a further advantageous configuration of the invention it is provided that the hydraulic cylinder is associated with a control system, which is configured to control and/or regulate a pressurization of the hydraulic cylinder by means of a hydraulic liquid. This allows for a precise control over the movement of the swing arm's wheel hub and thus of a center wheel mounted thereon. The control system can generally be connected or connectable with a control system of an associated vehicle in order to exchange information or may be a stand-alone control system.

In a further advantageous configuration of the invention it is provided that the control system is configured to apply the hydraulic cylinder at least within a predetermined pivoting range of the swing arm with a predetermined, in particular constant pressure and/or to limit a pressure in the hydraulic cylinder to a predetermined pressure value. This allows for a particularly flexible control and/or regulation of the pivoting motion of the swing arm and its wheel hub and prevents damage to the hydraulic cylinder and its associated hydraulic system. The maximum operating pressure in a hydraulic system generally depends on the component with the smallest maximum permissible operating pressure.

In a further advantageous configuration of the invention it is provided that a lever arm between the spring and/or damper element and a pivoting joint of the swing arm decreases upon pivoting the swing arm in a direction away from the ground and/or that a downward force on the center wheel decreases upon pivoting the swing arm in a direction away from the ground, if a constant force is applied on the spring and/or damper element. In other words it is provided that the force with which the third wheel hub is pressed down to the ground, decreases as the center wheel hub is pivoted upwards as long as a constant or at least essentially constant force is applied by the spring and/or damper element. This can for example be achieved by correspondingly arranging the hinge points of the swing arm and the spring and/or damper element (triangle of forces).

In a further advantageous configuration of the invention it is provided that the wheel hub for arrangement of the center wheel can be pivoted between a bearing position, in which a center of the wheel hub is positioned below a line connecting a center of the first wheel hub and a center of the second wheel hub, and a rest position, in which a center of the wheel hub is positioned above the line connecting the center of the first wheel hub and the center of the second wheel hub. This ensures that the bogie remains fully functional and keeps its advantages regardless of the current properties of the soil or ground.

A second aspect of the invention relates to a vehicle, in particular a forestry vehicle, with at least one bogie axle comprising a bogie according to the first aspect of the invention. This allows for an improved load-bearing and reduced soil load capacity of the vehicle especially in heavy terrain. The vehicle may for example be a self-propelled working machine, in particular a forestry vehicle such as a forestry harvester or a crane forwarder. Alternatively, the vehicle may be a trailer or the like. Preferably the vehicle comprises at least two bogies according to the first invention that are mounted on opposite sides of a vehicle frame. The resulting features and their advantages can be gathered from the description of the first aspect of the invention. Therein, advantageous configurations of the first inventive aspect are to be regarded as advantageous configurations of the second inventive aspect and vice versa.

In an advantageous configuration, it has proven advantageous that the first wheel is arranged on the first wheel hub of the bogie body, the second wheel on the second wheel hub of the bogie body, and the center wheel on the wheel hub of the swing arm. The first and second wheel can optionally be further equipped with a belt such that the center wheel can apply a downforce onto the belt in order to increase the contact area and reduce soil compaction on soft grounds such as for example forest soil.

Therein, in further configuration, it has proven advantageous if at least one out of the group first wheel, second wheel, and center wheel is a rubber air wheel. This enables particularly high soil protection and allows for an easy adaption to different soils by varying the air pressure of the respective wheel.

Further advantages arise if the center wheel has a smaller dimension than the first wheel and/or the second wheel. This allows for a sufficient supporting effect if need be without excessive weight increase of the bogie. Furthermore, the length of the bogie between first and second wheel does not increase or at least does not increase excessively, maintaining good maneuverability and controllability of the vehicle. For example, the diameter of the center wheel may be 0.9, 0.8, 0.7, 0.6, 0.5, 0.4, 0.3, 0.2, or 0.1 times the diameter of the first and/or the second wheel. Alternatively or additionally, the width of the center wheel may for example be 0.9, 0.8, 0.7, 0.6, 0.5, 0.4, 0.3, 0.2, or 0.1 times the width of the first and/or the second wheel.

In a further advantageous development of the invention it is provided that the swing arm preferably by means of the spring and/or damper element is capable of being pivoted between a bearing position, in which the center wheel is in contact with a ground on which the vehicle is positioned, and a rest position, in which the center wheel is lifted off the ground. In other words it is provided that the swing arm can be pivoted to the bearing position in order to bring the center wheel into contact with the ground, for example while the vehicle is used in heavy and/or soft terrain. This allows for a reduction of the vehicle's ground contact forces and avoids soil compaction and sinking-in of the vehicle. Alternatively, the swing arm can be pivoted to the rest position in order to lift the center wheel up from the ground, for example if the vehicle is used on firm ground, streets or the like. This reduces wear and tear of the center wheel and further reduces fuel consumption due to reduced rolling drag. The active movement of the swing arm between the bearing position and the rest position can be effected preferably by means of the spring and/or damper element. However, deviating technical solutions are conceivable, for example a manual movement of the swing arm to the rest position.

Figure 2:
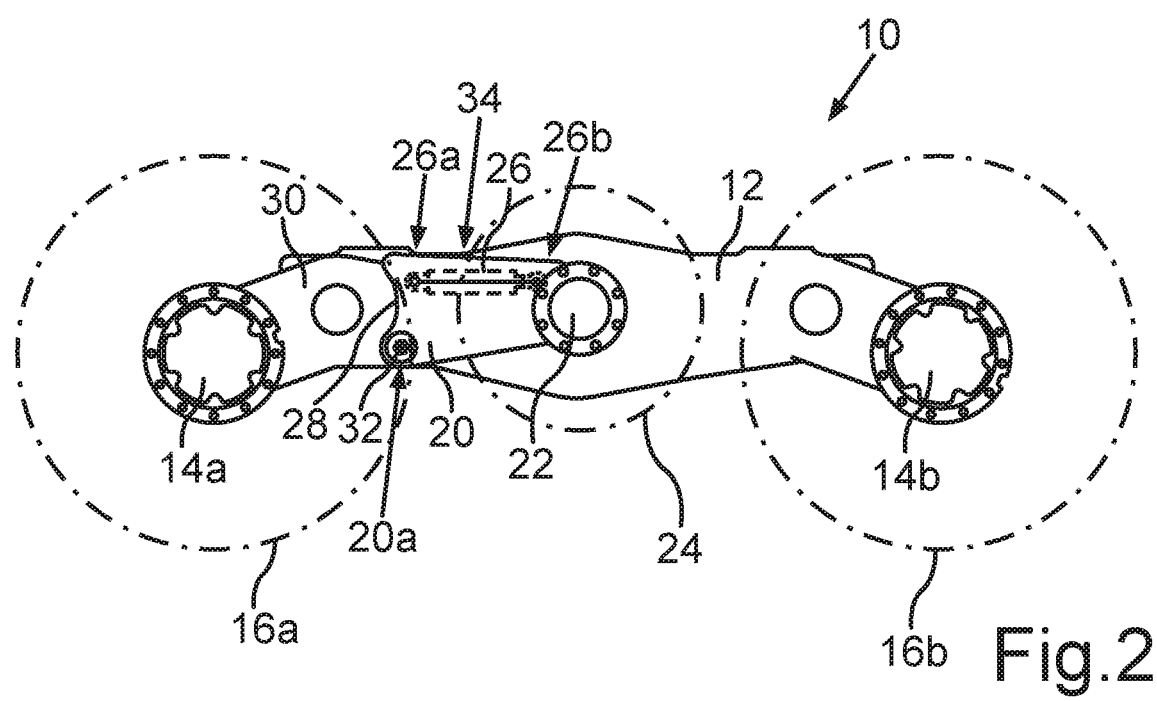
Figure 3:
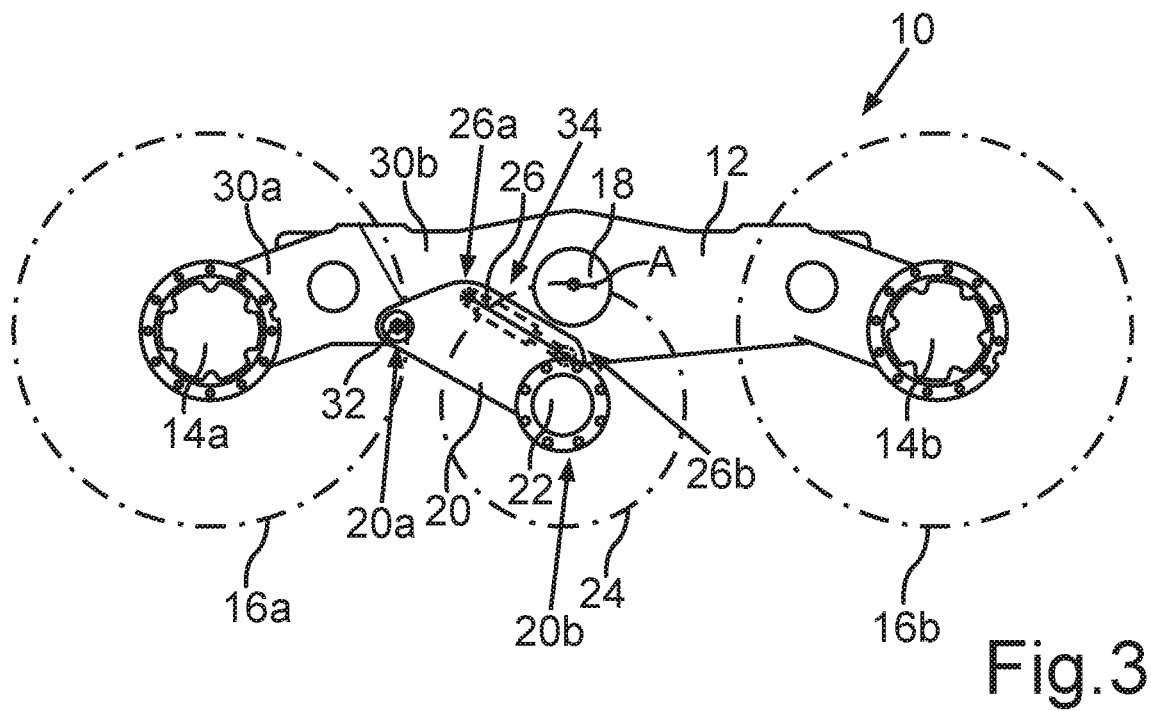
Figure 4:
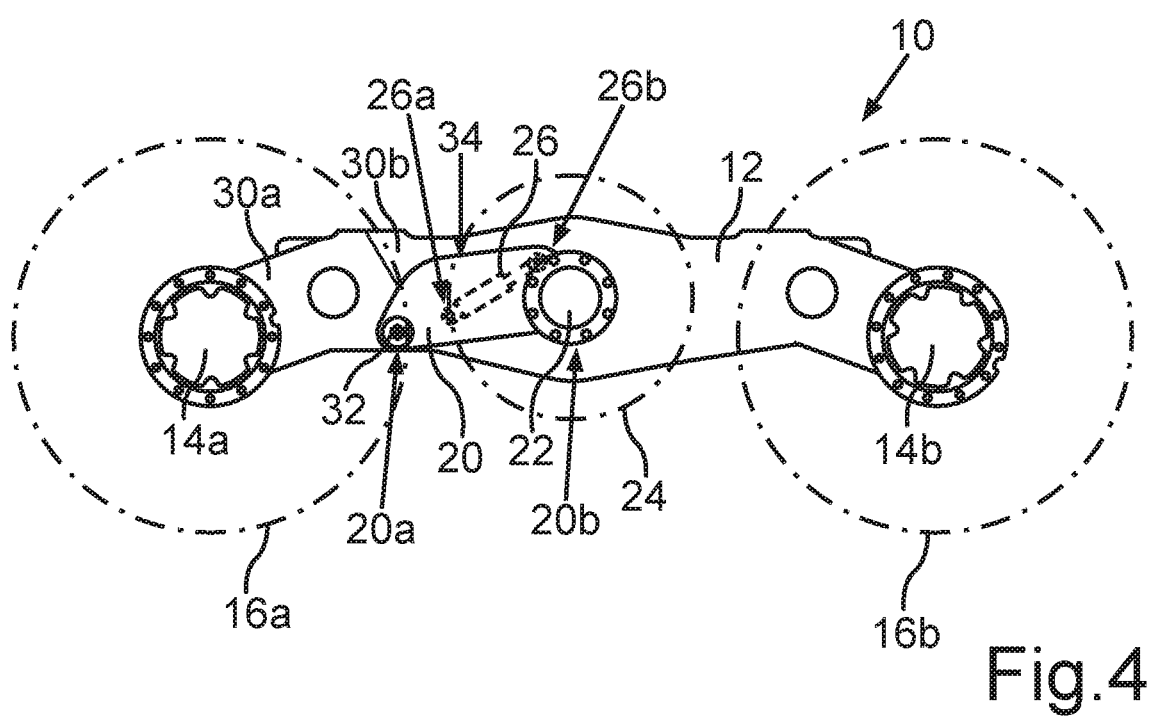
Figure 5:
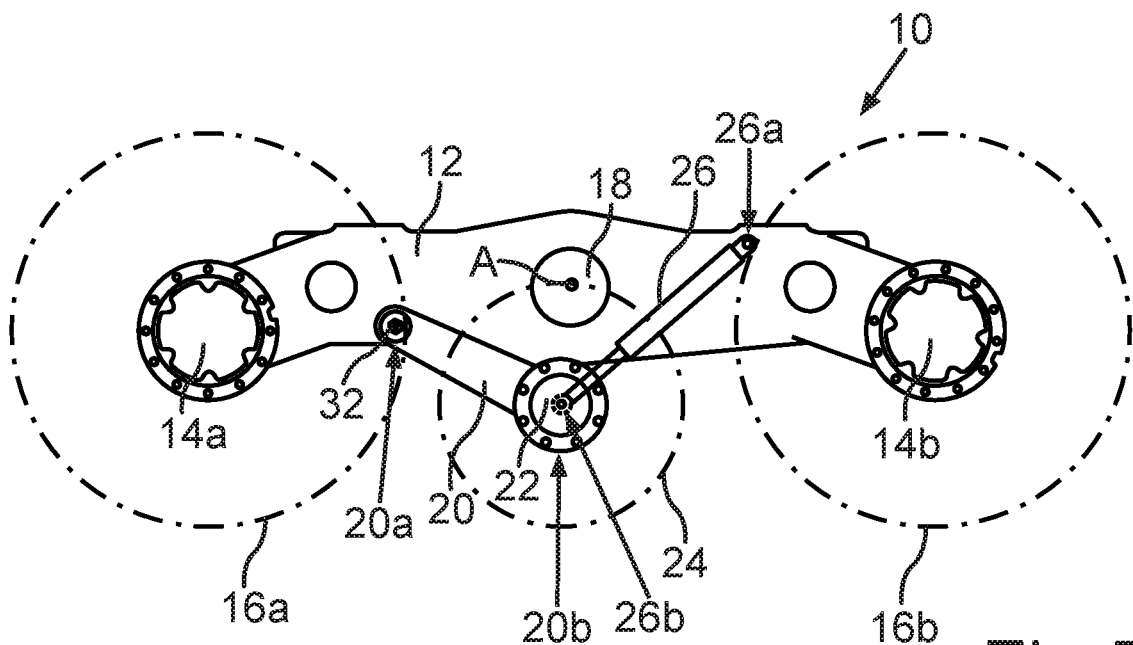
Figure 6:
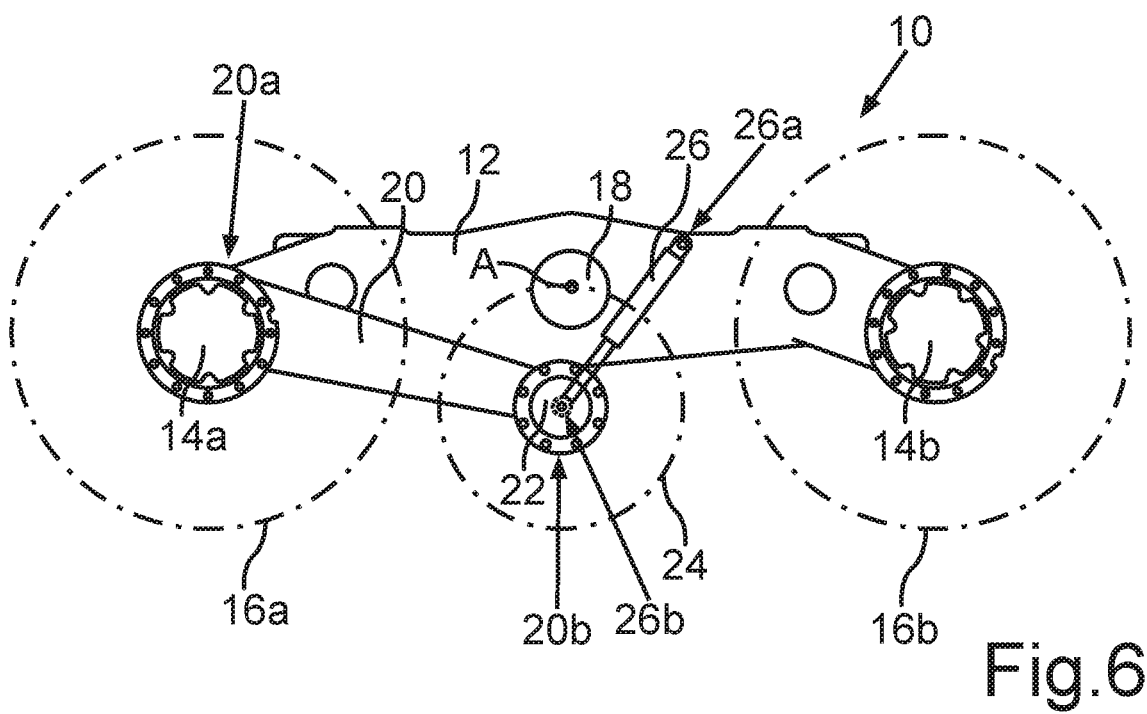

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims. The figures show in:

FIG. 1 a schematic side view of a bogie according to a first embodiment, wherein a swing arm is pivoted to a bearing position;

FIG. 2 a schematic side view of the bogie according to the first embodiment, wherein the swing arm is pivoted to a rest position;

FIG. 3 a schematic side view of the bogie according to a second embodiment, wherein the swing arm is pivoted to the bearing position;

FIG. 4 a schematic side view of the bogie according to the second embodiment, wherein the swing arm is pivoted to the rest position;

FIG. 5 a schematic side view of the bogie according to a third embodiment, wherein the swing arm is pivoted to the bearing position; and FIG. 6 a schematic side view of the bogie according to a fourth embodiment, wherein the swing arm is pivoted to the bearing position.

FIG. 1 shows a schematic side view of a bogie 10 for a bogie axle (not shown) for a forestry vehicle according to a first embodiment. The bogie 10 has a bogie body 12, which has a first wheel hub 14a for arrangement of a first wheel 16a and a second wheel hub 14b for arrangement of a second wheel 16b. The wheel hubs 14a, 14b of the present embodiment are arranged on fixed and slightly beveled arms of the bogie body 12. It is noted that different arrangements of the wheel hubs 14a, 14b can generally be provided. The bogie body 12 further comprises a linkage 18 to arrange the bogie 10 on the bogie axle, which in turn can be fitted on the frame of the vehicle, so that the bogie 10 can be pivoted in assembled condition around a horizontal axis A which is perpendicular to the drawing plane and transverse to a vehicle's longitudinal axis (not shown).

The bogie 10 further comprises a swing arm 20, which is pivotably hinged at a first end portion 20a on the bogie body 12 and at a second end portion 20b comprises a wheel hub 22 for arrangement of a center wheel 24 between the first wheel 16a and the second wheel 16b. For reasons of clarity, all wheels 16a, 16b, and 24 are shown with dashed lines. The first wheel 14a, the second wheel 14b, and center wheel 24 are rubber air wheels.

Still further, the bogie 10 comprises a spring and/or damper element 26, which at one end portion 26a is hinged on the bogie body 12 and at the other end portion 26b is hinged on the second end portion 20b of the swing arm 20. In the present embodiment, the spring and/or damper element 26 is a hydraulic cylinder that can be pressurized with hydraulic liquid. The spring and/or damper element 26 can further be associated with a control system (not shown), which may be configured to control and/or regulate the pressurization of the hydraulic cylinder by means of said hydraulic liquid. The spring and/or damper element 26 can generally apply a force with a force component in the direction of the soil in order to pivot the swing arm 20 in the shown bearing position to push the center wheel 24 to the ground with a predetermined wheel contact force. The rotation axes of the swing arm and the rotation axes of the spring and/or damper element 26 are arranged axially parallel relative to each other. One recognizes that the swing arm 20 and the spring and/or damper element 26 relative to the linkage 18 of the bogie body 12 are mounted on the same side of the bogie body 12, i.e. the left side. Further, the swing arm 20 and the spring and/or damper element 26 are mounted on the same flange 28 of a component 30 of the bogie body 12. In the present example, the swing arm 20 is mounted by means of a rotary joint, which comprises one slide bearing bushing 32 on either side of the flange 28.

However, different arrangements are also conceivable. The swing arm 20 according to the present example generally is U-shaped and forms a casing 34, in which the spring and/or damper element 26 is predominantly arranged within irrespective of the pivoting position of the swing arm 20 relative to the bogie body 12.

One recognizes that the center wheel 24 in the shown bearing position is positioned at least essentially in the center between the first and second wheel 16a, 16b which leads to a uniform force distribution of the wheels 16a, 16b, and 24 and consequently to a very low soil compaction.

Since the force of the spring and/or damper element 26 is limited due to a limited pressure in the associated hydraulic system of the hydraulic cylinder, the vertical wheel force of the center wheel 24 is limited, too. As soon as the force of the spring and/or damper element 26 is exceeded, for example because the center wheel 24 is rolling over a rock, tree or another obstacle, the center wheel 24 swings upwards and evades the obstacle so that at least one of the first and second wheels 16a, 16b keeps permanent ground contact. This prevents the vehicle weight from resting on the center wheel 24 alone. The control system can be used to control and/or regulate the hydraulic pressure of the hydraulic cylinder 26 to achieve a desired exertion of force on the center wheel 24 during the pivoting of the swing arm 20. For example, the force of the hydraulic cylinder 26 can be kept at least essentially constant during the swiveling of the swing arm 20. Alternatively, the force can be varied depending on the relative rotational position of the swing arm 20 with respect to the bogie body 12. Alternatively or additionally, the hydraulic cylinder 26 can be connected to a hydraulic circuit or hydraulic system having a pressure control valve to avoid inadmissibly high hydraulic pressures.

FIG. 2 shows a schematic side view of the bogie 10 according to the first embodiment, wherein the swing arm 20 is pivoted to a rest position. This rest position can be used in situations where the additional vertical wheel force of the center wheel 24 is not needed, for example during empty runs, travel on solid ground and the like. One recognizes that the spring and/or damper element 26 taken is completely inside the casing 34 of the swing arm 20. If the spring and/or damper element 26 comprises an active element such as a hydraulic cylinder, it is possible to actively move the center wheel 24 to the rest position, for example by selecting a respective button, switch, menu point or the like in or at the vehicle. Alternatively or additionally it may be provided that the swing arm 20 is moved manually and/or mechanically in the rest position. Further, a stop can be provided, by means of which the movability of the swing arm 20 relative to the bogie body 12 is limited. In the current example, the stop is realized by the design of the flange 28 and the swing arm 20.

FIG. 3 shows a schematic side view of the bogie 10 according to a second embodiment, wherein the swing arm 20 is pivoted to the bearing position. The general structure of the bogie 10 is known from the previous example. In contrast to the first example the spring and/or damper element 26 and the swing arm 20 are hinged on different components 30a, 30b of the bogie body 12. However, it may alternatively be provided that the spring and/or damper element 26 and the swing arm 20 are hinged on the same component 30 of the bogie 10. Further, the relative arrangement of the end portion 26a of the spring and/or damper element 26 and of the end portion 20a of the swing arm 20 differs and leads to a different lever arm and thus to a different triangle of forces of the swing arm 20, resulting in a downforce on the wheel hub 22 that depends on the relative position of the center wheel hub 22 with respect to the bogie body 12. Thus, the force exerted by the spring and/or damper element 26 on the swing arm 20 can be varied by choosing different attachment points (26a, 20a) of the spring and/or damper element 26 and the swing arm 20 on the bogie body 12. In this second embodiment, the attachment and hinging points 20a, 26a, 26b are arranged in such a way that the downward force exerted by the spring and/or damper element 26 on the wheel 24 decreases when the swing arm 20 rises, if a constant force on the spring and/or damper element 26 is applied.

FIG. 4 shows a schematic side view of the bogie 10 according to the second embodiment, wherein the swing arm 20 is pivoted to the rest position. Again, it can be recognized that the spring and/or damper element 26 is taken completely inside the casing 34 of the swing arm 20 and thus protected from environmental influences. In this uppermost position, i.e. in the rest position, almost no downforce is applied to the wheel hub 22 and the center wheel 24 anymore.

FIG. 5 shows a schematic side view of the bogie 10 according to a third embodiment, wherein the swing arm 20 is pivoted to the bearing position. The general structure of the bogie 10 is also known from the previous examples. In contrast to the first and second example, the swing arm 20 and the spring and/or damper element 26 are mounted in a V-shape on opposite sides on the bogie body 12 with respect to the linkage 18. The first end portion 20a of swing arm 20 in other words is mounted near the first wheel hub 14a, while the one end portion 26a of the spring and/or damper element 26 is mounted near the second wheel hub 14b of the bogie body 12. The swing arm 20 therefore does not form or comprise a casing 34 and can be more compactly designed. The spring and/or damper element 26 has a longer spring and/or damper travel compared to the previous examples. By pulling in the spring and/or damper element 26, the center wheel 24 can again be moved from the shown bearing position to the rest position in which the swing arm 20 and the spring and/or damper element 26 are aligned essentially linearly.

FIG. 6 shows a schematic side view of the bogie 10 according to a fourth embodiment, wherein the swing arm 20 is pivoted to the bearing position. In contrast to the previous examples it is provided that a rotation axis of the swing arm 20 and a rotation axis of the first wheel hub 14a are arranged coaxially by mounting the first end portion 20a of the swing arm 20 between the bogie body 12 and the first wheel hub 14a. Further, the end portion 26a of the spring and/or damper element 26 is mounted to a different position on the bogie body 12 compared to the third example, which results in differing lever arms.

LIST OF REFERENCE SIGNS 10 bogie
12 bogie body
14a first wheel hub
14b second wheel hub
16a first wheel
16b second wheel
18 linkage
20 arm
20a end portion
20b end portion
22 wheel hub
23 center wheel
26 spring and/or damper element
26a end portion 26b end portion
28 flange
30 component
30a component
30b component
32 bushing
34 casing
A axis

What is claimed is:

1. A bogie for a forestry vehicle, comprising:
a bogie body, which has a first wheel hub for arrangement of a first wheel and a second wheel hub for arrangement of a second wheel,
a swing arm, which is pivotably hinged at a first end portion on the bogie body and at a second end portion comprises a wheel hub for arrangement of a center wheel between the first wheel and the second wheel, and
a spring and/or damper element, which at one end portion is hinged on the bogie body and at the other end portion is hinged on the swing arm and by means of which the swing arm is capable of being applied with force,
wherein the wheel hub for arrangement of the center wheel can be pivoted between a bearing position, in which a center of the wheel hub is positioned below a line connecting a center of the first wheel hub and a center of the second wheel hub, and a rest position, in which a center of the wheel hub is positioned above the line connecting the center of the first wheel hub and the center of the second wheel hub.

2. The bogie according to claim 1, wherein the first end portion of the swing arm is mounted on the bogie body by a rotary joint.

3. The bogie according to claim 1, wherein the swing arm and the spring and/or damper element are mounted on the same side of the bogie body relative to a linkage of the bogie body for hinging the bogie on an axle beam of a bogie axle, and/or that the swing arm and the spring and/or damper element are hinged on the same component of the bogie body or on different components of the bogie body.

4. The bogie according to claim 1, wherein a portion of the spring and/or damper element is arranged within an associated casing of the swing arm.

5. The bogie according to claim 1, further comprises a stop configured to limit the movability of the swing arm relative to the bogie body.

6. The bogie according to claim 1, wherein at least one rotation axis of the swing arm and at least one rotation axis of the spring and/or damper element are arranged axially parallel relative to each other.

7. The bogie according to claim 1, wherein the spring and/or damper element comprises a hydraulic cylinder.

8. The bogie according to claim 7, wherein the hydraulic cylinder is associated with a control system, which is configured to control and/or regulate a pressurization of the hydraulic cylinder using a hydraulic liquid.

9. The bogie according to claim 8, wherein the control system is configured to apply, at least within a predetermined pivoting range of the swing arm, a predetermined constant pressure to the hydraulic cylinder and/or to limit a pressure in the hydraulic cylinder to a predetermined pressure value.

10. A vehicle comprising:
at least one bogie axle that comprises a bogie according to claim 1.

11. The vehicle according to claim 10, wherein the first wheel is arranged on the first wheel hub of the bogie body, the second wheel is arranged on the second wheel hub of the bogie body, and the center wheel is arranged on the wheel hub of the swing arm.

12. The vehicle according to claim 11, wherein at least one out of the group of the first wheel, the second wheel, and the center wheel is a rubber air wheel.

13. The vehicle according to claim 11, wherein the center wheel has a smaller dimension than the first wheel and/or the second wheel.

14. The vehicle according to claim 10, wherein the swing arm is configured to be pivoted between the bearing position, in which the center wheel is in contact with a ground on which the vehicle is positioned, and the rest position, in which the center wheel is lifted off the ground, by the spring and/or damper element.

15. The bogie of claim 1, wherein at least one rotation axis of the swing arm is arranged coaxially relative to a rotation axis of the first or second wheel hub.

16. The bogie according to claim 1, wherein the swing arm and the spring and/or damper element are mounted on opposite sides of the bogie body relative to a linkage of the bogie body for hinging the bogie on an axle beam of a bogie axle.

17. The vehicle according to claim 10, wherein the vehicle is a forestry vehicle.

* * * * *